July 24, 1962 W. J. HERRINGTON 3,045,959
TREE BASE STAND
Filed Nov. 24, 1958

INVENTOR.
W. J. Herrington
BY Wm. T. Wofford
Attorney

United States Patent Office 3,045,959
Patented July 24, 1962

3,045,959
TREE BASE STAND
W. J. Herrington, 1512 SE. 18th St., Mineral Wells, Tex.
Filed Nov. 24, 1958, Ser. No. 775,921
3 Claims. (Cl. 248—47)

My invention relates to tree base stands, and more particularly to lightweight portable base stands for supporting a severed small tree trunk in an upright position. An important application of my invention is that of a base support stand for Christmas trees, and although it is by no means limited to such application, for convenience it will be described herein with reference to that application.

A Christmas tree base stand to approach the ideal should meet as many of the following requirements as possible: it should be light in weight, simple in structure, economical to manufacture, convenient to set up, easy to take down, foldable to a small package for storage, readily adaptable to various tree trunk diameters, readily adaptable to an uneven floor or other support surface, capable of correcting for crooked tree trunks, capable of holding the tree firmly in a selected upright position, have a high degree of stability when set up, incorporate a reasonable degree of ruggedness and durability, and provide for immersion of the lower portion of the tree trunk in a water container. All of the tree base stands of the prior art of which I am aware fall short of the above-mentioned requirements in several respects.

It is accordingly the general object of my invention to provide an improved tree base stand.

Another object of my invention is to provide a tree base stand that will approach as closely as possible the ideal as set forth by the requirements above-mentioned.

These and other objects are effected by my invention as will be apparent from the following description taken in accordance with the accompanying drawing, forming a part of this application, in which.

Figure 1:
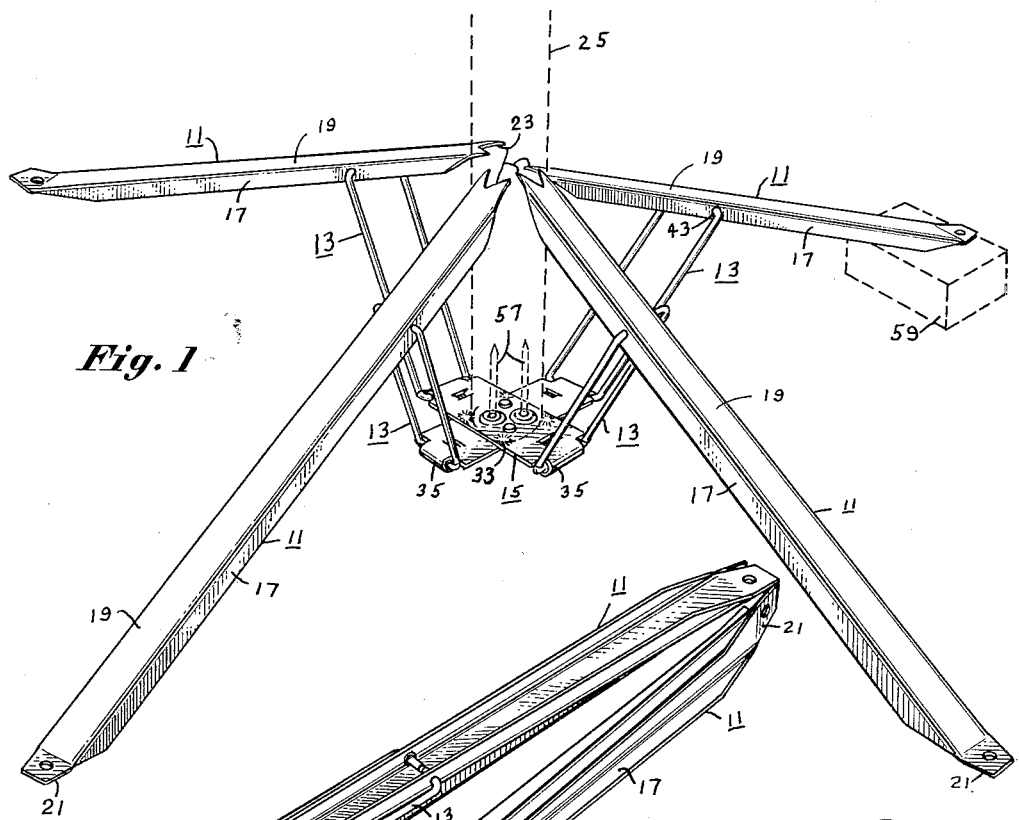
FIG. 1 is a perspective view showing a tree base stand in accordance with a preferred eembodiment of my invention.

Referring now to the drawings there is shown a tree base stand comprising four leg members 11, four linkage members 13, and a base member 15. Each leg member is in the form of a shallow channel having sides 17 and a bottom 19, and having an outwardly turned foot portion 21 at one end and forked prongs 23 or serrations at the other end. The channel sides 17 are made to slope to the channel bottom 19 adjacent each end of the leg member, so that the foot portion 21 and the serrated portion 23 are actually an integral part of the channel bottom 19. The side edges of the foot portion 21 are tapered slightly inwardly toward its outer end, and the foot portion is bent to form an obtuse angle with the outer surface of the channel bottom 19 so that the inner surface of the foot will be approximately horizontal when the tree base stand is set up in a typical manner. The serrated portion 23 of the leg member 11 is turned inwardly slightly, so that the prongs 23 will have a greater tendency to dig into the tree trunk 25. The base member 15 is made up of two pieces 27, 29 of strap material fixed together by brads 31 and/or welds 33 at right angles at their center portion in the form of a cross. The end portions of each strap member have a reduced width portion which has been rolled under to form a sleeve bearing 35 for the linkage member 13. Each linkage member 13 is a rod formed into a deep U shape, with the bottom portion of the U forming a pivot shaft 37 to be received by a respective base member sleeve bearing 35, with the sides 39 of the U tapering slightly inwardly in the direction away from the bottom 37 thereof, and with outer end portions of the sides of the U turned inwardly so as to be substantially parallel to the bottom and oppositely disposed to form pivot stub shafts 41. Each leg member 11 is provided with a pair of aligned oppositely disposed circular openings 43 in its sides at points approximately one third of the leg member length away from the leg member pronged end. These circular openings 43 provide pivot bearings for the stub shafts 41 above-mentioned. Each linkage member 11, when assembled with the base member 15, is spring biased so as to be urged to rotate about its base member pivot axis in the direction toward the base member center. The spring biasing for each linkage member 13 is accomplished by means of a pair of coil springs 45, 47 positioned side by side on the bottom 37 of the U within the bearing sleeve 35. One end 49 of each spring is looped over a respective side 39 of the U and the other end 51 of each spring 45, 47 is held against the under side of the base member 15 by a respective small integral flap 53 which has been formed by making a three sided cut in the base member and pressing it outward beyond the base member surface. A pair of openings 55 are provided in the base member adjacent its center portion, adapted for receiving nails 57 to be driven into the end of the trunk 25 of the tree to be supported.

Figure 2:
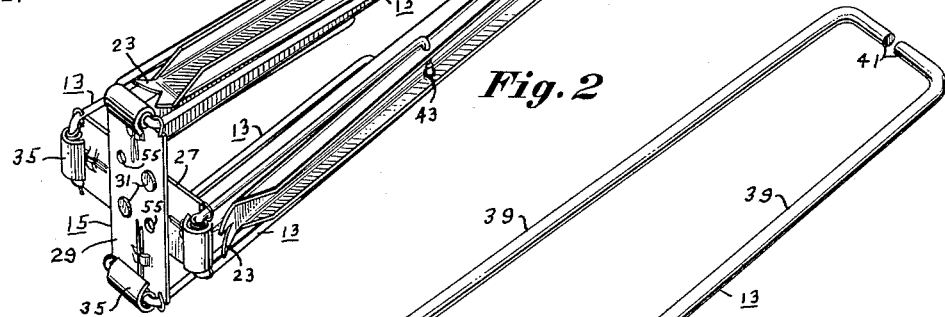
FIG. 2 is a perspective view of the tree base stand of FIG. 1 shown in the folded position, ready for storage.
Figure 3:
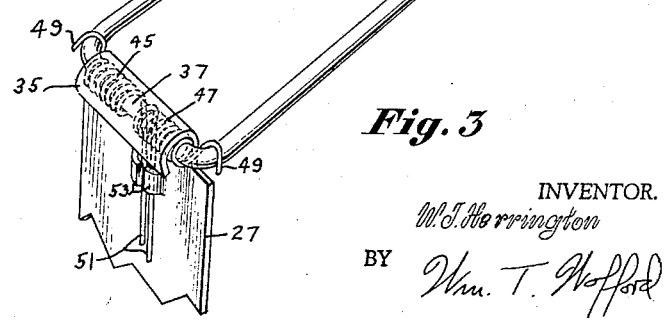
FIG. 3 is an enlarged perspective view showing details of a portion of the tree base stand of my invention.

FIG. 1 shows the tree base stand in a typical erected position, supporting a tree the trunk 25 of which is indicated by dotted lines. The block 59, indicated by dotted lines, is intended to illustrate the capability of the device to cope with an uneven floor or other support surface. FIG. 2 shows the tree base stand in the folded or storage position. It should be noted that distance between the pronged ends 23 of the leg members 11 and their respective pivot points 43, and the length of the respective linkage members 13 is made such that the pronged ends 23 of the leg members 11 can swing through the bottom end 37 of the U.

To erect the device it is preferable to begin with it in the folded position, spreading the leg members 11 apart sufficiently to insert the trunk 25 of the tree to be supported into contact with the base member 15, and then nailing the base member to the tree trunk 25. Next the leg members 11 are rotated to bring their pronged ends 23 into contact with the tree trunk 25 at trial setting points with the legs making an acute angle with the tree trunk. Next the tree and stand are set upright on the floor or other base support. Then the positions of the individual prongs 23 are moved up or down to final adjustment positions. If the base support is too high at one leg member foot position, it is only necessary to move the pronged end of that leg member downward on the tree trunk to a compensating position. If the base support is too low at one or more leg member foot locations, then their pronged ends are simply moved upward on the tree trunk to compensating positions. If the tree trunk is crooked, this can be compensated by lowering leg member pronged ends on one side and raising them on the other as required, so that the trunk is held in a compensating tilted position by the base stand. When in the erected position, the pronged ends 23 of the leg members 11 are of course urged into contact with the tree trunk 25 by the spring bias aforementioned. Also, the greater the weight of the load on the base stand, the more firmly the pronged ends grip the tree trunk, due to the coaction of the base member 15, the linkage members 13, and the leg members 11. In other words, any downward force applied to the base member is transmitted to the leg members, which force has components directed inwardly toward the tree trunk. The base member with the tree trunk bottom portion will depend below the leg pivot axes sufficiently so that it may be immersed in a container of water (not shown) if desired.

It will be seen from the foregoing that the tree base stand of my invention can be made light in weight, is simple in structure, economical to manufacture, convenient to set up, easy to take down, foldable into a small package for storage, readily adaptable to various tree trunk diameters, readily adaptable to uneven floor or other support surfaces, capable of compensating for crooked tree trunks, capable of holding the tree firmly in a selected upright position, has a high degree of stability when set up, incorporates a reasonable degree of ruggedness and durability, and provides for immersion of the lower portion of the tree trunk in a water container.

The foregoing disclosure and the showings made in the drawings are merely illustrative of the principles of my invention and are not to be interpreted in a limiting sense.

For example, preferred materials for construction of the device are lightweight metal for the leg members 11, metal strap material for the base member 15, and metal rod material for the linkage members 13, however other materials could be used without departing from my invention. Furthermore it is apparent that the leg members could be urged toward the tree trunk by various resilient bias means, as for example by springs or resilient bands tied to the leg members adjacent their prong ends and surrounding the tree trunk.

While I have shown my invention in only one form, it will be obvious to those skilled in the art that it is not so limited, but is susceptible of various changes and modifications without departing from the spirit thereof.

I claim:

1. A tree base stand comprising in combination: a base member including a pair of metal strap pieces fixed together at their center portions in the form of a cross and having their free ends rolled to form sleeve pivot bearings; four leg members in the form of lightweight metal channels each having a foot portion at one end and an inwardly turned pronged portion at the other end; four linkage means each made of metal rod stock to have the form of a deep U forming pivot shaft means at the bottom of said U and having sides terminating in a pair of oppositely disposed inwardly turned stub pivot shafts, said pivot shaft means being disposed in said respective sleeve, coil spring means on said pivot shaft means within said sleeve bearing and having one end bearing on said base member and the other end restraining said linkage means, a pair of aligned oppositely disposed pivot bearing openings in the channel sides of each said leg member, with said stub shafts received by said openings, with the distance between said pivot points for a respective linkage member being greater than the distance from said leg member pivot openings to the pronged end of said respective leg member.

2. A tree base stand comprising in combination: a base member adapted for contacting the end of the trunk of a tree to be supported and having a plurality of outwardly extending projections each having its end rolled to form a sleeve pivot bearing; a leg member for each said projection in the form of a lightweight metal channel having an end adapted for contacting said tree trunk, linkage means for each said projection, said means made of metal rod stock to have the form of a deep U forming pivot shaft means at the bottom of said U and having sides terminating in a pair of oppositely disposed inwardly turned stub pivot shafts, said pivot shaft means being disposed in said respective sleeve, coil spring means on said pivot shaft means within said respective sleeve bearing and having one end bearing on said base member and the other end restraining said linkage means, a pair of aligned oppositely disposed pivot bearing openings in the channel sides of a respective leg member with said stub shafts received by respective openings, with the distance between said pivot points for a respective linkage member being greater than the distance from said leg member pivot openings to the tree engaging end of said respective leg member.

3. A tree base stand comprising in combination: a base member adapted for contact with the bottom of the trunk of a tree to be supported, a plurality of leg members for mounting said base member above a supporting surface, a plurality of linkage members, means pivotally fixing each said linkage member at one of its end portions to a respective leg member intermediate the length of said respective leg member, means pivotally fixing each said linkage member at the other of its end portions to said base member, and a spring mounted on said base member at said other end portion of each linkage member and coacting between said other end portion of each respective linkage member and said base member to urge said respective linkage member in the direction toward said tree trunk.

References Cited in the file of this patent
UNITED STATES PATENTS

| | | |
|---|---|---|
| 687,902 | Rossmann | Dec. 3, 1901 |
| 1,549,959 | Berman | Aug. 18, 1925 |
| 2,107,638 | Lyons | Feb. 8, 1938 |
| 2,708,559 | De Mais | May 17, 1955 |
| 2,761,641 | Lubbers | Sept. 4, 1956 |